Aug. 9, 1955 R. H. BAUMAN 2,714,941
AUTOMATIC BRAKE WEAR ADJUSTOR
Filed Jan. 4, 1954 2 Sheets-Sheet 1

INVENTOR.
Robert H. Bauman
BY
Craig V. Morton
Attorney

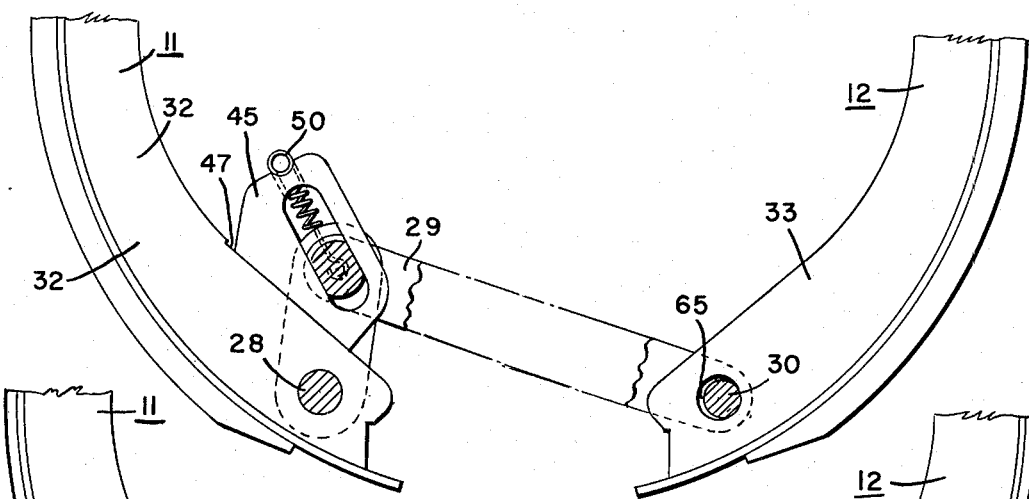
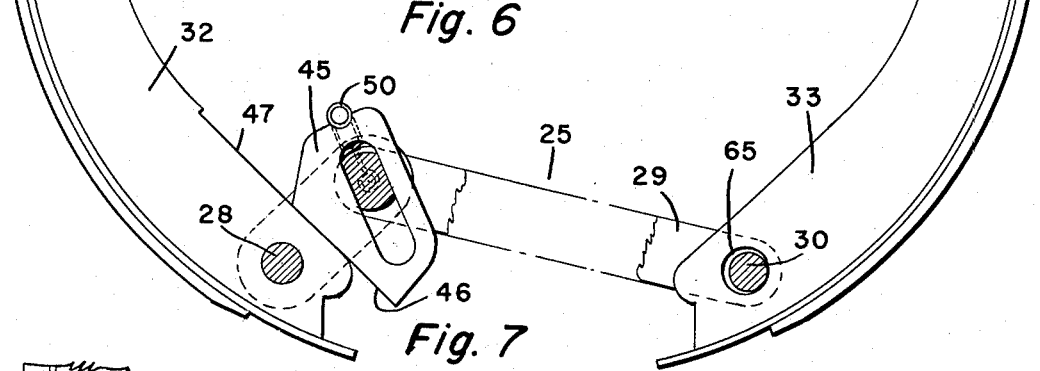
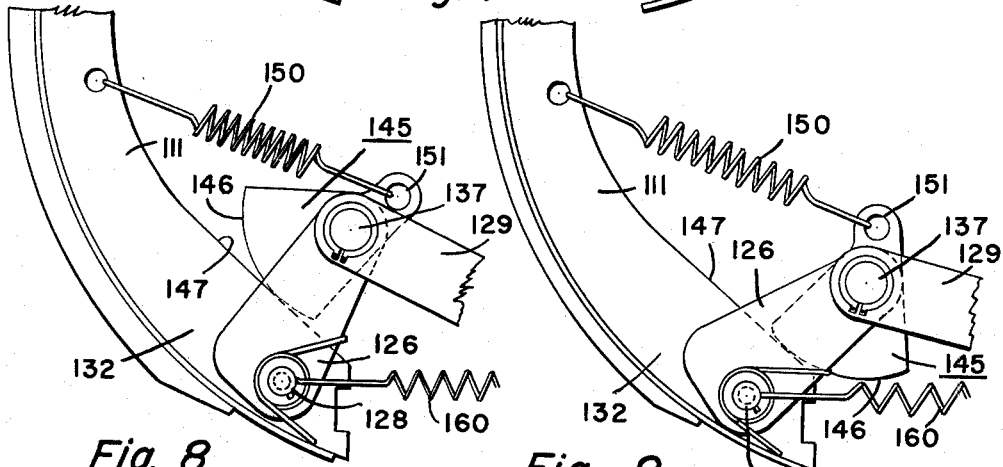

United States Patent Office 2,714,941
Patented Aug. 9, 1955

2,714,941

AUTOMATIC BRAKE WEAR ADJUSTOR

Robert H. Bauman, Dayton, Ohio, assignor to General Motors Corporation, a corporation of Delaware Application January 4, 1954, Serial No. 402,044

5 Claims. (Cl. 188—79.5)

This invention relates to brake structures and particularly to an adjusting mechanism for adjusting the brake shoes relative to the brake drum automatically.

It is conventional practice to provide adjusting devices in a brake structure for adjusting the clearance between the brake shoe and the brake drum of a brake structure. These adjusting devices are usually manually operated so that a mechanic can periodically readjust the position of the brake shoes relative to a brake drum to reestablish a desired clearance between the shoe and the drum as the brake lining wears under normal operating conditions.

It is an object of this invention to provide an adjusting mechanism positioned between cooperating brake shoes of a brake structure to effect adjustment of the brake shoes relative to the brake drum automatically to maintain the clearance between the brake shoes and the brake drum substantially constant throughout the life of the brake lining.

It is another object of the invention, in accomplishing the foregoing object, to provide a simplified adjusting device comprising a lever system and a wedge member in a structural arrangement in which the wedge member moves relative to one of the brake shoes to effect an extension of the lever system and thereby provide for adjustment of the brake shoes relative to the brake drum of the brake structure.

Further objects and advantages of the present invention will be apparent from the following description, reference being had to the accompanying drawings wherein a preferred form of the invention is clearly shown.

In the drawings:

Figure 6 is an enlarged elevational view of the adjusting mechanism illustrating it in one inactive position.

Figure 7 is an elevational view similar to Figure 6 but illustrating the adjusting mechanism in a position assumed after substantial wear of the brake linings.

Figure 8 is an elevational view of a modified structural arrangement of the adjusting mechanism.

Figure 9 is an elevational view similar to Figure 8 but illustrating the mechanism in a position after substantial wear of the brake lining.

Figure 1:
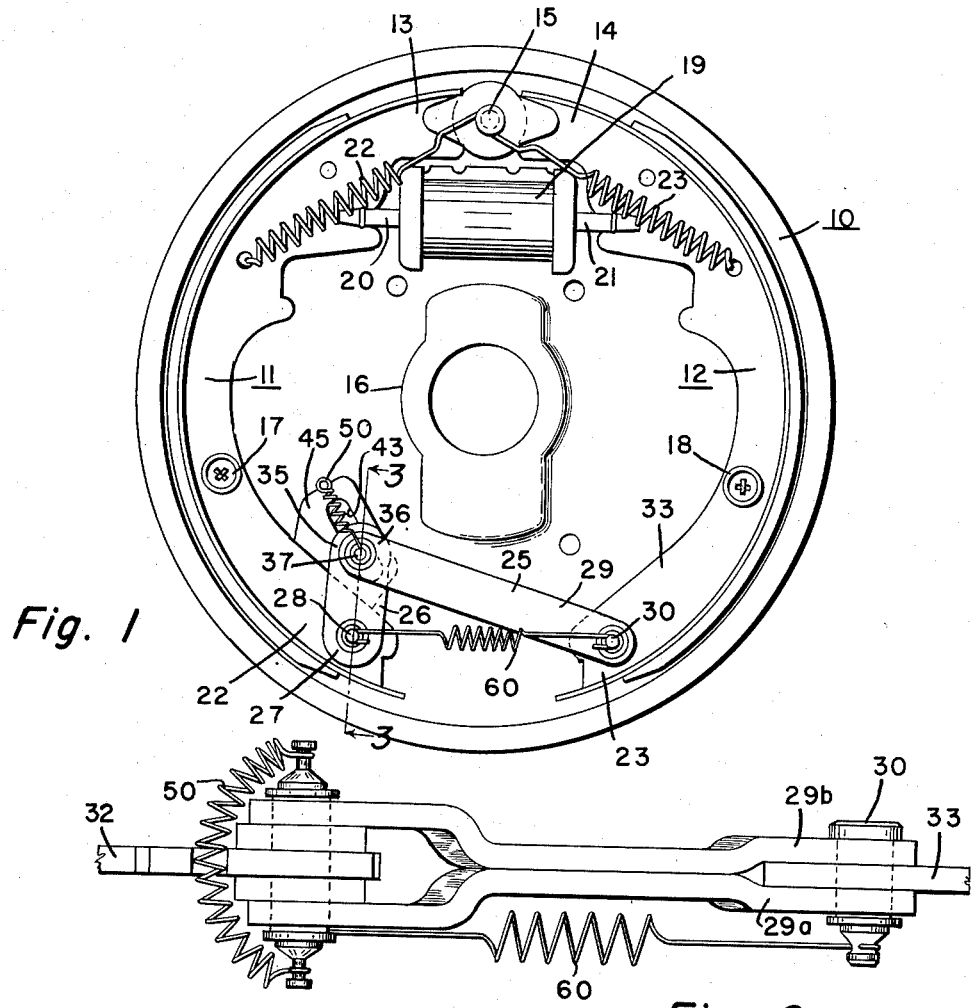
Figure 1 is a cross sectional view of a brake structure, illustrating the brake operating mechanism in elevation, incorporating features of this invention.
Figure 2:
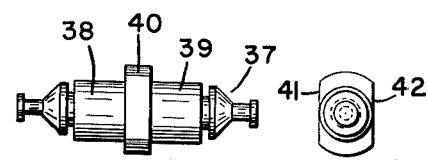
Figure 2 is a plan view of the brake adjusting mechanism.

In this invention the brake structure comprises a brake drum 10 mounted on the wheel of a motor vehicle in conventional manner. A pair of brake shoes 11 and 12 are positioned within the drum 10. The upper adjacent ends 13 and 14 of the brake shoes engage an anchor pin 15. The brake shoes are supported upon the backing plate 16 by means of spring retainers 17 and 18 in conventional manner.

Between the upper adjacent ends 13 and 14 of the brake shoes there is provided a hydraulically operated wheel cylinder 19 that is suitably connected with a hydraulic brake system on the motor vehicle. Plungers 20 and 21 extend from the wheel cylinder 19 to effect actuation of the brake shoes 11 and 12.

Retraction springs 22 and 23 extend between the brake shoes 11 and 12 respectively and the anchor pin 15 to retain the brake shoes in normal retracted position.

Between the opposite adjacent ends 22 and 23 of the brake shoes 11 and 12 respectively there is provided an automatic adjusting mechanism 25 that provides for adjustment of the brake shoes 11 and 12 relative to the drum 10 automatically as the brake linings on the shoes 11 and 12 wear in the course of normal operation of the motor vehicle.

The brake adjusting mechanism 25 comprises a first short link 26 that has the end 27 pivotally connected with the end 22 of the brake shoe 11 by means of the pivot pin 28. A second long link 29 is similarly pivotally connected with the end 23 of the brake shoe 12 by means of the pivot pin 30. The pivot pins 28 and 30 are held in position by means of snap rings or C washers 31, as illustrated in Figure 3.

Actually, the link 26 comprises two link members 26a and 26b positioned on opposite sides of the brake shoe web 32 of the brake shoe 11. Similarly, the link 29 comprises the two elements 29a and 29b positioned on opposite sides of the brake shoe web 33 of the brake shoe 12.

The end 35 of the link 27 is connected with the end 36 of the link 29 by means of a pin 37 whereby the links 26 and 29 form a jackknife lever system between the adjacent ends 22 and 23 of the brake shoes and the pin 37 forms the knee joint of the lever system.

Figures 3, 4, 5:
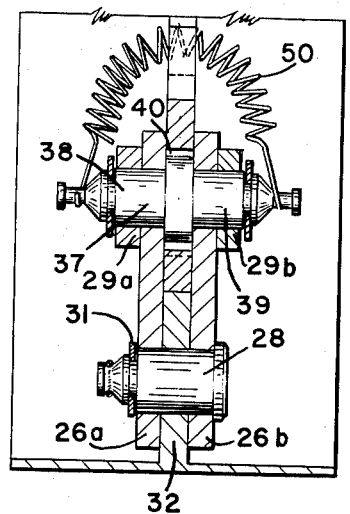
Figure 3 is a cross sectional view taken along line 3—3 of Figure 1.
Figure 4 is an elevational view of one of the pivot pins of the lever system.
Figure 5 is an end elevational view of the pin of Figure 4.

The pivot pin 37 is provided with cylindrical portions 38 and 39 that extend through the link elements 26a, 29a and 26b, 29b as illustrated in Figure 3. Between the link elements 26a and 26b, the pin 37 is provided with an enlarged portion 40 that has the flat sides 41 and 42 that ride in a slot 43 provided in a wedge member 45 carried on the pin 37 at the knee joint of the jackknife lever system.

The wedge member 45 has the slot 43 thereof positioned angular to a planar face 46 that engages a cooperating planar face 47 on the upper edge of the web 32 of the brake shoe 11. The cooperating faces 46 and 47 provide irreversible sliding cam engagement between the wedge 45 and the web 32 so that downward movement of the wedge 45, as viewed in Figure 7, can be readily effected but upward movement of the wedge relative to the web 32 will be prevented.

A coil spring 50 extends between opposite ends of the knee pin 37 and passes over and in engagement with the wedge 45 to urge movement of the wedge relative to the web 32 upon extension of the jackknife lever system 26, 29 toward a planar condition resulting from relative movement between the ends 22 and 23 of the brake shoes. A tension spring 60 extends between the pivot pins 28 and 30 to retain the adjacent ends 22 and 23 of the brake shoes in a retracted position when the brake is inactive.

It will be apparent from the foregoing description that when hydraulic fluid under pressure is delivered to the wheel cylinder 19, the plungers 20 and 21 will move outwardly to move the brake shoes 11 and 12 into engagement with the brake drum 10. Since the retraction springs 22 and 23 for the brake shoes 11 and 12 are stronger than the spring 60, the first movement of the brake shoes 11 and 12 will occur at the ends 22 and 23 thereof to spread these ends into engagement with the brake drum 10, the anchor pin 15 acting as a pivot for the brake shoes 11 and 12 at this time.

A clearance opening 65 is provided between the pivot pin 30 and the web 33 to provide for a normal movement between the brake shoes and the drum before actuation of the adjusting device 25 occurs. This clearance opening therefore provides the desired normal clearance between the brake linings and the brake drum when the brake is in an inactive position.

So long as the spreading movement between the ends 22 and 23 of the brake shoes is not greater than the lost motion connection provided by the clearance opening 65, no actuation of the brake adjusting mechanism 25 will occur.

However, as the brake linings wear, the spreading movement of the adjacent ends 22 and 23 of the brake shoes will become greater so that finally the pin 30 moves a distance greater than that provided by the lost motion connection 65 with resultant actuation of the jackknife lever system 26 and 29 tending to move the levers toward a planar condition.

As the link 26 rotates about the pivot 28, as drawn by the link 29, the distance between the face 47 on the web 32 and the center line of the knee pin 37 increases, this allows the wedge member 45 to be moved downwardly, that is toward the end of the web 32, as viewed in Figure 7. This movement of the wedge 45 relative to the web 32, is equivalent to the spread of the brake shoes resulting from wear of the linings.

When the brake is released, the wedge 45 will retain the adjusting mechanism 25 in its newly assumed position with the brake shoes 11 and 12 readjusted to maintain the normal clearance between the brake shoes and the brake drum.

In Figures 8 and 9 there is illustrated a slightly modified arrangement of the structure of the adjusting mechanism wherein the spreading slipper wedge arrangement 45 illustrated in Figures 1 to 7, is replaced with a rotatable cam. In all respects however the operation of the device of Figures 8 and 9 is comparable with the operation of the device illustrated in Figures 1 to 7.

In the modified arrangement shown in Figures 8 and 9 the brake shoe 111 carries the link 126 on a pivot pin 128. The link 126 is connected with the link 129 which in turn is connected with the adjacent cooperating brake shoe in the same manner as the link 29 of Figure 1.

The links 126 and 129 are connected together at their free ends by the pin 137 forming thereby a knee joint. The knee pin 137 pivotally supports a wedge member 145 having a cam face 146 that engages the surface 147 of the web 132. A spring 150 extends between the end 151 of the wedge cam 145 and the web 132 normally urging the wedge cam 145 in a counter-clockwise direction about the knee pin 137. A tension spring 160 extends between opposite adjacent ends of the brake shoes to hold them in a retracted position.

When the brake is operated, the same sequence of events occur with reference to the device shown in Figures 1 to 7. The only difference is that the wedge cam 145 will rotate about the knee pivot 137 to move from a position shown in Figure 8 to a position shown in Figure 9 in making automatic adjustment of the brake shoes relative to the brake drum during the life of the brake lining. However, the cooperating surfaces 147 and 146 also provide an irreversible sliding cam engagement that prevents movement of the jackknife lever system once it has been spread by actuation through relative movement of the adjacent ends of the brake shoes.

While the form of embodiment of the invention as herein disclosed constitutes a preferred form, it is to be understood that other forms might be adopted as may come within the scope of the claims which follow.

What is claimed is as follows.

1. In a brake structure, an adjusting mechanism for adjusting the clearance between the brake shoes and the brake drum of the brake structure, the combination of, a pair of cooperating brake shoes, and an adjusting device between two adjacent ends of the brake shoes to effect relative movement between the shoes comprising, a pair of lever means forming a jackknife lever system between the said adjacent ends with the free ends of the lever means connected respectively with the brake shoes with one of the connections being a lost motion connection, a wedge member carried on the knee joint of said lever system and positioned between the said knee joint and one of said shoes in engagement with the said shoe and movable relative to the same upon extension of the said lever system by relative movement between the said adjacent ends of said shoes to spread the same, and resilient means operably connected with said wedge member to effect movement thereof on the knee joint toward the apex of the jackknife lever system upon extension movement of the lever system.

2. In a brake structure, an adjusting mechanism for adjusting the clearance between the brake shoes and the brake drum of the brake structure, the combination of, a pair of cooperating brake shoes, and an adjusting device between two adjacent ends of the brake shoes to effect relative movement between the shoes comprising, a pair of lever means forming a jackknife lever system between the said adjacent ends with the free ends of the lever means connected respectively with the brake shoes with one of the connections being a lost motion connection, a wedge member carried on the knee joint of said lever system and positioned between the said knee joint and one of said shoes in engagement with the said shoe, said one shoe and said wedge member having engaging inclined surfaces effecting an irreversible cam engagement therebetween and movable relatively upon extension of the said lever system by relative movement between the said adjacent ends of said shoes to spread the same, and resilient means operably connected with said wedge member to effect movement thereof on the knee joint toward the apex of the jackknife lever system upon extension movement of the lever system.

3. In a brake structure, an adjusting mechanism for adjusting the clearance between the brake shoes and the brake drum of the brake structure, the combination of, a pair of cooperating brake shoes, and an adjusting device between two adjacent ends of the brake shoes to effect relative movement therebetween comprising, a first link means pivotally connected at one end with one end of one of said brake shoes, a second link means pivotally connected to the adjacent end of the other of said brake shoes, one of said connections comprising a lost motion connection, said link means having their opposite ends pivotally connected together whereby to form a jackknife lever system between adjacent ends of said brake shoes, said lever system being extendable toward a planar condition by relative spreading movement between the adjacent ends of the brake shoes connected therewith, a wedge member carried on the knee joint of said lever system and positioned between the said knee joint and one of said shoes in engagement therewith and movable relative to the same, said wedge member and the shoe engaged thereby each having cooperating relatively inclined surfaces providing an irreversible cam engagement therebetween, and resilient means connected with said wedge member to effect movement thereof relative to said shoe engaged thereby toward the apex of the lever system upon extension of the lever system.

4. In a brake structure, an adjusting mechanism for adjusting the clearance between the brake shoes and the brake drum of the brake structure, the combination of, a pair of cooperating brake shoes, and an adjusting device between two adjacent ends of the brake shoes to effect relative movement therebetween comprising, a first link means pivotally connected at one end with one end of one of said brake shoes, a second link means pivotally connected to the adjacent end of the other of said brake shoes, one of said connections comprising a lost motion connection, said link means having their opposite ends pivotally connected together whereby to form a jackknife lever system between adjacent ends of said brake shoes, said lever system being extendable toward a planar condition by relative spreading movement between the adjacent ends of the brake shoes connected therewith, a wedge member pivotally supported on the knee joint of said lever system for rotation thereon and positioned between the said knee joint and one of said shoes, said wedge member and the shoe engaged thereby each having cooperating relatively inclined surfaces providing an irreversible cam engagement therebetween, and resilient means connected with said wedge member to effect movement thereof relative to said shoe engaged thereby toward the apex of the lever system upon extension of the system.

5. In a brake structure, an adjusting mechanism for adjusting the clearance between the brake shoes and the brake drum of the brake structure, the combination of, a pair of cooperating brake shoes, and an adjusting device between two adjacent ends of the brake shoes to effect relative movement therebetwen comprising, a first link means pivotally connected at one end with one end of one of said brake shoes, a second link means pivotally connected to the adjacent end of the other of said brake shoes, one of said connections comprising a lost motion connection, said link means having their opposite ends pivotally connected together whereby to form a jackknife lever system between adjacent ends of said brake shoes, said lever system being extendable toward a planar condition by relative spreading movement between the adjacent ends of the brake shoes connected therewith, a wedge member carried on the knee joint of said lever system and positioned between the said knee joint and one of said shoes in engagement therewith and movable relative to the same, said wedge member and the shoe engaged thereby each having cooperating relatively inclined surfaces providing an irreversible cam engagement therebetween, said wedge member having an elongated slot therein disposed angular to the aforesaid surface thereof and receiving a pin extending through the same forming the knee joint of said lever system to provide for movement of said wedge member relative to the shoe engaged thereby upon extension movement of said lever system by relative movement between said shoes, and resilient means connected with said wedge member to effect movement thereof relative to said shoe engaged thereby toward the apex of the lever system upon extension of the system.

No references cited.